(12) United States Patent
Singh et al.

(10) Patent No.: US 10,326,729 B2
(45) Date of Patent: Jun. 18, 2019

(54) INTELLIGENT SOCIAL FEED GENERATOR

(71) Applicant: Accenture Global Services Limited, Dublin (IE)

(72) Inventors: Gurdeep Singh, Bangalore (IN); Alex Kass, Palo Alto, CA (US); Upendra Chintala, Bangalore (IN); Veenu Arora, Sriganganagar (IN)

(73) Assignee: Accenture Global Services Limited, Dublin (IE)

( * ) Notice: Subject to any disclaimer, the term of this patent is extended or adjusted under 35 U.S.C. 154(b) by 406 days.

(21) Appl. No.: 14/957,300

(22) Filed: Dec. 2, 2015

(65) Prior Publication Data

US 2016/0162471 A1 Jun. 9, 2016

(30) Foreign Application Priority Data

Oct. 26, 2015 (IN) .......................... 6114/CHE/2014

(51) Int. Cl.
*G06F 13/00* (2006.01)
*H04L 12/58* (2006.01)
*G06Q 50/00* (2012.01)

(52) U.S. Cl.
CPC ............. *H04L 51/32* (2013.01); *G06Q 50/01* (2013.01)

(58) Field of Classification Search
CPC .. G06Q 10/107; G06Q 30/02; G06Q 30/0241; G06Q 30/0251; G06Q 30/0273; G06Q 30/0277; H04L 12/585; H04L 12/58; H04L 12/581; H04L 12/5855; H04L 51/32; G06F 13/00

USPC ....................................... 705/14.73; 709/206
See application file for complete search history.

(56) References Cited

U.S. PATENT DOCUMENTS

| | | |
|---|---|---|
| 2010/0318398 A1 | 12/2010 | Brun et al. |
| 2011/0302249 A1 | 12/2011 | Orr et al. |
| 2013/0031080 A1 | 1/2013 | Vijaywargi et al. |
| 2014/0136609 A1 | 5/2014 | Churchill et al. |
| 2014/0257902 A1 | 9/2014 | Moore et al. |
| 2014/0278356 A1 | 9/2014 | Anglin et al. |
| 2014/0379497 A1* | 12/2014 | Varma .................... G06Q 30/06 705/14.73 |

OTHER PUBLICATIONS

Australian Patent Office, First Examination Report for Australian Patent Application No. 2015264893 dated Dec. 2, 2016, 9 pages.
Australian Patent Office, Second Examination Report for Australian Patent Application No. 2015264893 dated May 23, 2017, 6 pages.
Australian Patent Office, Third Examination Report for Australian Patent Application No. 2015264893 dated Sep. 21, 2017, 6 pages.

* cited by examiner

*Primary Examiner* — Robert B Harrell
(74) *Attorney, Agent, or Firm* — Brinks Gilson & Lione

(57) ABSTRACT

An intelligent social feed generator system leverages existing social platforms to generate context specific social feeds having enhanced messages that facilitate context specific user actions. The system implements technical features that analyze messages on existing social platforms to determine a message context and identify responsive user actions. The system generates enhanced messages allowing the user to take such action. The system also dynamically generates an enhanced social feed based on a particular usage context, where the social feed is formed of messages that match the usage context.

17 Claims, 7 Drawing Sheets

INTELLIGENT SOCIAL FEED GENERATOR

PRIORITY CLAIM

This application claims priority to India provisional application serial number 6114/CHE/2014, filed in the India Patent Office on Dec. 5, 2014, and entitled "An Intelligent Social Feed Generator," and India non-provisional application serial number 6114/CHE/2014, filed in the India Patent Office on Oct. 26, 2015, and entitled "An Intelligent Social Feed Generator," both of which are incorporated herein by reference in their entirety.

TECHNICAL FIELD

This disclosure relates to a system for generating a social feed that may facilitate or enhance collaborative experiences in the enterprise context.

BACKGROUND

Advances in computer and communication technologies have changed the way in which people interact with one another, and have both necessitated and facilitated the development of technology to enable collaboration between users. Social communications platforms have become ubiquitous in the modern era, and represent the primary method of communication for much of the current generation. These technologies have also spawned social platforms for use in the enterprise context that serve to connect employees throughout the enterprise. The enterprise context, however, presents unique challenges that existing social platforms are unable to address, and a need exists to provide a social platform that enables a richer collaborative experience and enhances user productivity.

DETAILED DESCRIPTION

Figure 1:
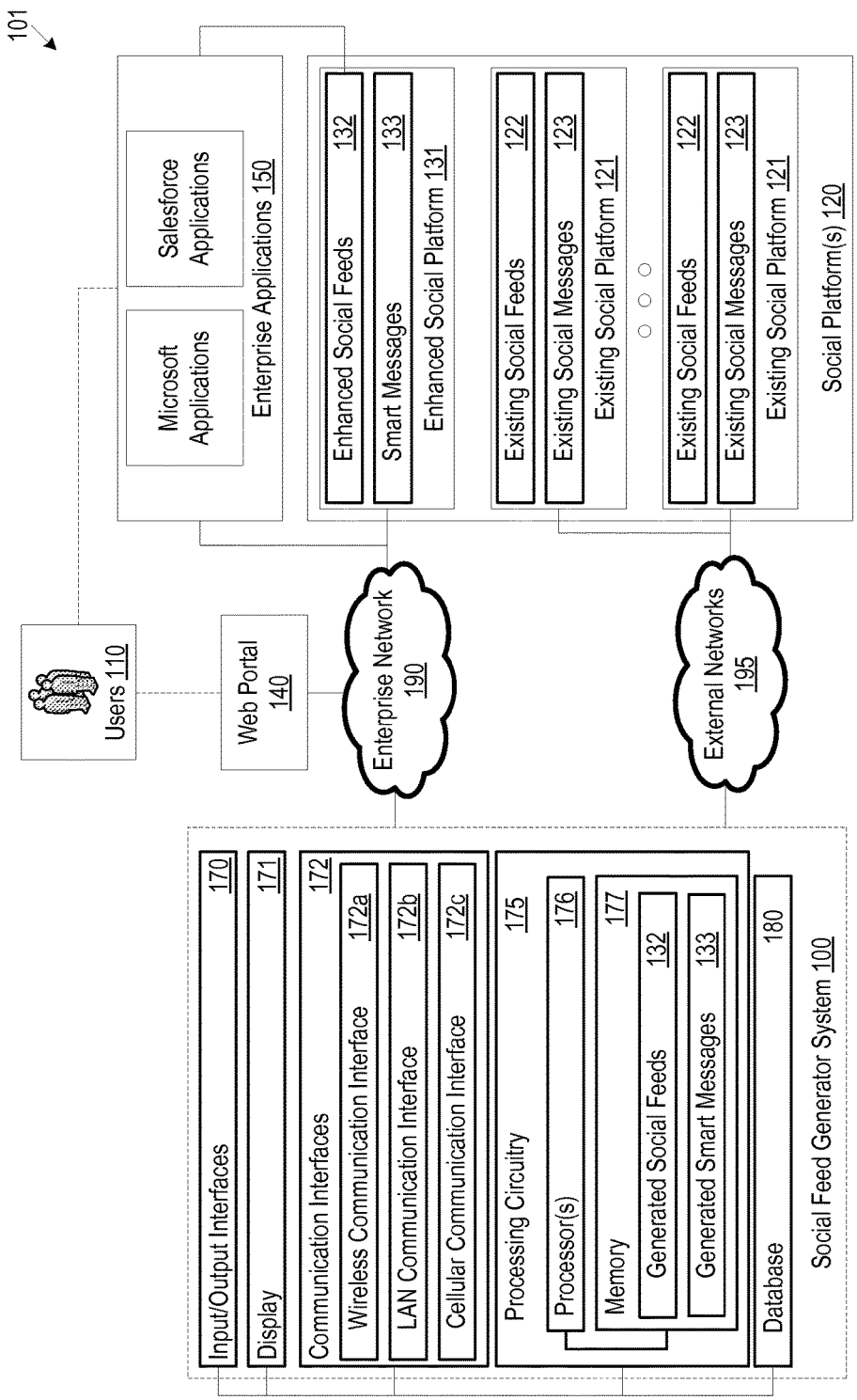
FIG. 1 shows an example of an environment in which the system may be employed.

FIG. 1 provides an example of the environment 101 in which the intelligent social feed generator system 100 ("system 100") may be deployed. The environment 101 may include the system 100, one or more users 110, one or more message communication platforms, such as the social platforms 120, and one or more enterprise applications 150.

The system 100 may include one or more input/output interfaces 170, a display 171, one or more communication interfaces 172, and processing circuitry 175. The processing circuitry 175 may include a processor 176, a memory 177 and may be connected with one or more databases 180. The communication interfaces 172 may include, as examples, a wireless communication interface 172a, a wired communication interface 172b, and a cellular communication interface 172c, any of which may support connectivity over any type of network (e.g., WiFi, 4G/LTE, or Ethernet) for receiving data and transmitting data. The system 100 may receive and transmit data between the users 110, social platforms 120 and enterprise application 150 through both internal enterprise networks 190 (e.g., a network within a given enterprise) and external networks 195 (e.g., including the Internet).

The system 100 may interface any number and type of message communication platforms, such as the individual social platforms 121. The social platforms 121 may provide messaging feeds and other capabilities to the users 110, which may facilitate, e.g., basic communication or group discussions between users 110. As a particular example, the social platforms 121 may provide the users 110 with social feeds 122 that may contain various messages sent by a user 110 and received from other users 110. The social platforms 121 may also provide social feeds 122 for group discussions, and may provide support for file management, for example, allowing users to attach or upload documents. The message feeds from any message communication platform may vary widely in implementation, and may include, as examples, email message delivery, instant messenger message delivery, text message feeds, publication/subscription message service feeds, and really simply syndication (RSS) feeds.

As described in greater detail below, the system 100 may leverage the social platforms 121, and their social feeds 122, to provide enhanced functionality to the user 110, for example, through an enhanced social platform 131. The enhanced platform 131 may provide users with an enhanced social feed 132 that may provide the users 110 with robust, context dependent, actionable messages.

The system 100 may present the enhanced social feed 132 over a variety of communication pathways. The users 110 for example may access the enhanced social platform 131 through a web portal 140 provided over the enterprise network 190 or the external networks 195. In some implementations (e.g., within the workplace), the system 100 may prevent the users 110 from accessing the social platforms 121 over external networks 195, for example, if the user 110 is behind a firewall. The system 100, however, need not restrict its communication with the external networks 195, and may connect to the social platforms 121 and provide access to the enhanced social platform 131.

The system 100 may also integrate the enhanced social feeds 132 into one or more enterprise applications 150. The enterprise application 150 may, for example, integrate the enhanced social feeds 132 through a plug-in or module provided within or alongside the enterprise application 150. The enterprise applications 150 may provide data to help form the enhanced social feeds 132. For example, if a user is posting a new task request, the system 100 may access different enterprise applications 150 to determine who the various resources are and to whom the task may be assigned. In this way, the enterprise application 150 may provide the system 100 with details about the users, and may ensure that the enhanced social feed 132 is populated with relevant and accurate information. The enterprise applications 150 may also help support making the message actionable, as the actionable messages may have additional information provided by the enterprise application 150) embedded therein. By way of example, the enterprise applications 150 may include products available from Salesforce or Microsoft, including products such as Microsoft Exchange™, Active Directory®, Microsoft Project™, and SharePoint® applications, or some other custom database solution. Microsoft Exchange™ application may generally provide e-mail and calendar functionality to the users 110, for example, allowing users 110 to coordinate meetings between themselves. Microsoft Project™ application may generally provide task management features, for example, allowing tasks to be assigned to different users 110 as well as tracking the progress of a task through user updates. The system 100 may also integrate the enhanced social feeds 132 within a web browser application 150 or on the mobile device of the user 110, for example, through integration with the mobile operating system (e.g., iOS integration) or a standalone application (iPhone® applications).

The enhanced social feeds 132 provided by the system 100 may be context dependent based on the work that the user 110 is performing. For example, a user 110 working on a document in an enterprise level application 150 may be presented with an enhanced social feed 132 that may be populated with information related to that project or task. The system 100 may gather or determine contextual information used in generating the enhanced social feed 132 in a variety of ways, for example, by examining a variety of different attributes of the document or presentation that the user 110 is working on. The system 100, for example and without limitation, may look at the name of the document, the table of contents for the document, the heading of a section within the document, and certain keywords appearing within the document.

Figure 7:
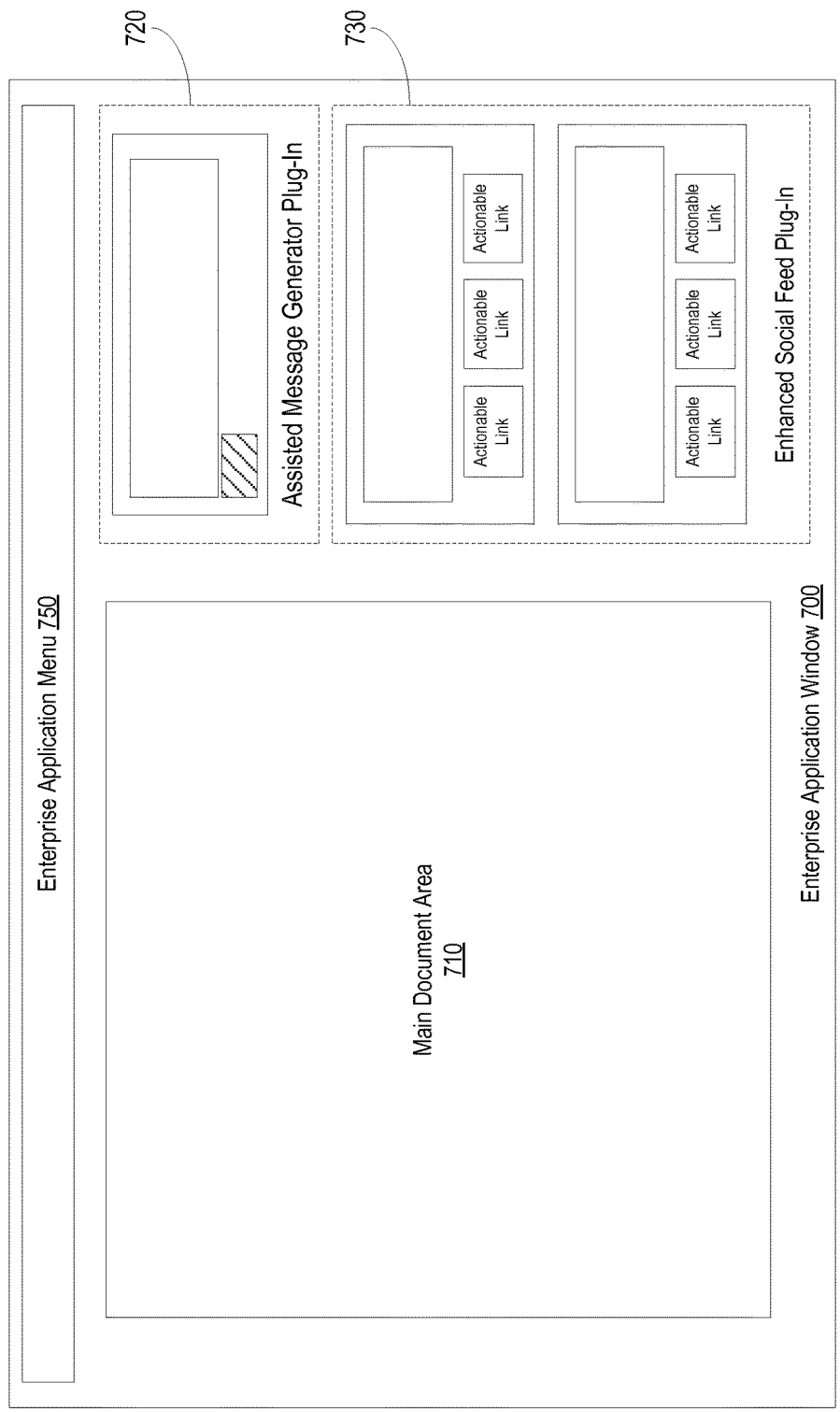
FIG. 7 illustrates an example of an enterprise application integrating an enhanced social feed in a plug-in region.

The enhanced social feed 132 may also vary based on the communication pathway being used by the user 110, for example, if they view the enhanced social feed 132 through a web portal 140 or through enterprise applications 150 In such cases, the system 100 may provide an enhanced social feed 132 responsive to the communication pathway. As illustrated in FIG. 7, for example, the enterprise application 150 may provide an application window 700 having a main document area 710, a menu bar 750 and an enhanced social feed area 730. The enhanced social feed area 730 may provide an enhanced social feed 132 relevant to the document that is being worked on in document area 710.

By obtaining context dependent information, the system 100 may provide targeted information to a user 110 and may help prevent a user 110 from being overwhelmed with information of little or no relevance. The social feeds 122 on the social platforms 121, for example, may include social messages 123 from various users 110 on disparate topics, making it difficult for a user 110 to identify the relevant information in any given social feed 122. Moreover, in contrast to social platforms 121 that are passively consumed by users 110, the system 100 may provide an enhanced social feed 132 that better engages the user 110 and facilitates user 110 responses and actions. The system 100 may also facilitate communication between users 110 by ensuring that a message or post is directed to the users 110 and stakeholders who may be interested in receiving the message.

Figure 2:
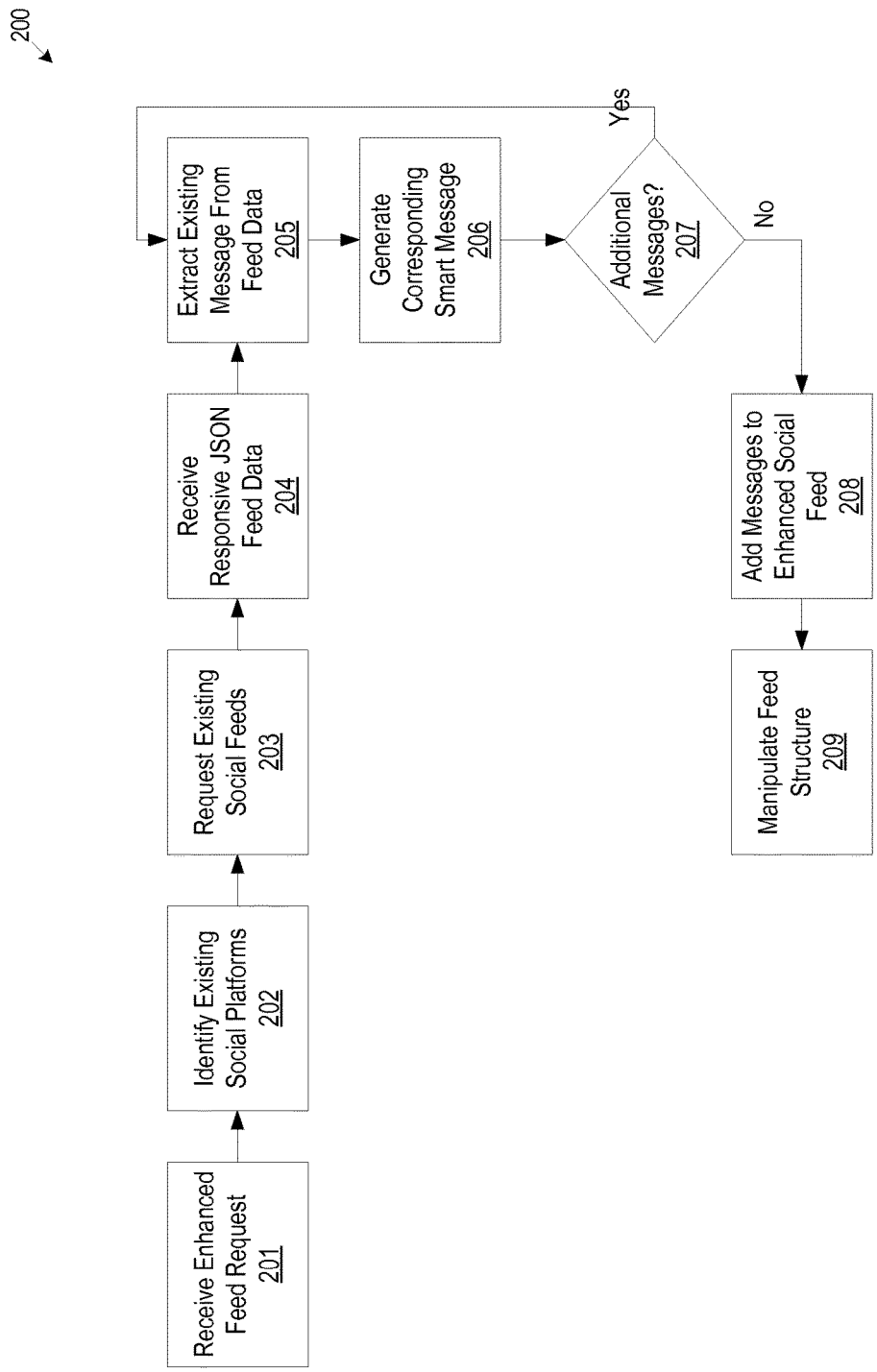
FIG. 2 illustrates some of the logic that the system may employ in generating an enhanced social feed.

As noted above, the system 100 may generate enhanced social feeds 132, which may provide a user 110 with actionable, context dependent information. FIG. 2 illustrates logic 200 that the system 100 may employ in generating an enhanced social feed 132.

The system 100 may receive a request for an enhanced social feed 132 (201). The request may include various parameters, including those that describe the context in which the enhanced social feed 132 may be consumed. The request, for example, may include a number of keywords and data ranges (e.g., a date range) that capture the appropriate usage context. As noted above, the contextual information provided in the request may be determined by examining different attributes of the document or presentation that the user 110 is working on. The system 100 may receive an enhanced feed request from a variety of different sources, including for example an enterprise application 150 or through a web portal 140 for the enhanced social platform 131. The enhanced social feed 132 may be requested in a continuous manner so that the enhanced social feed 132 remains relevant to the context (e.g., container application) in which it is being viewed or consumed. In this way, the system 100 may be automatically updated as new messages are added to the enhanced social feed 132 and may also account for a change in the usage context. For example, the enhanced social feed 132 provided to the user 110 may change when the user 110 switches tasks or opens a different document.

The system 100 may process the request and identify the social platforms 121 that the system 100 may interface with (202). The system 100 may initiate communication with the identified social platforms 121, for example, over a web or other messaging interface provided by or exposed by the existing platform 121. The system 100, for example, may interface with a social platform 121 using a web service (e.g., a representational state transfer application programming interface (a "REST API" service)) provided by the existing platform 121.

With the existing platforms 121 and corresponding messaging interfaces identified, the system 100 may request one or more existing social feeds 122 (203). The system 100 may also request additional information from the existing platforms including, for example, user profile information. As the messaging interfaces offered may vary and may even be unique to a particular existing platform 121, the system 100 may be capable of generating requests for each web service. The social platform 121, in response, may provide the requested social feed 122 data, for example, in the form of a JavaScript Object Notation ("JSON") feed (204). The social feed 122 data returned by the web service may contain the existing social message 123 and meta-data, including, for example, tags that have been applied to the social message 123, information regarding the user 110 who posted the social message 123, the date and time the social message 123 was posted, and a unique handler of the social message 123 which may be used to reference that social message 123 and other social messages 123 in the thread.

The system 100 may extract or retrieve the existing social message 123 from the received feed data (205). For example, the received feed data may be a collection of individual messages returned as a JSON object, where the JSON object may provide the individual messages as a separate entity within an XML formatted dataset, which the system 100 may extract. The system 100 may process the extracted social message 123 to generate an enhanced message 133, which may provide enhanced functionality relative to the existing social message 123 (206). In the case of group discussions, the system 100 may process each message of a group discussion separately, for example, processing the first parent message and automatically processing subsequent responsive messages.

As described in greater detail below, for example, the system 100 may analyze the existing social message 123. The system 100 may extract and process the existing social messages 123 in any order to form the enhanced social feed 132 (207). The system 100 may incorporate the generated enhanced messages 133 and the non-actionable messages within the enhanced social feed 132 (208). Once the enhanced social feed 132 has been generated, the system 100 may manipulate how the enhanced social feed 132 is structured, for example, sorting the enhanced messages by date or by importance (209).

Figure 3:
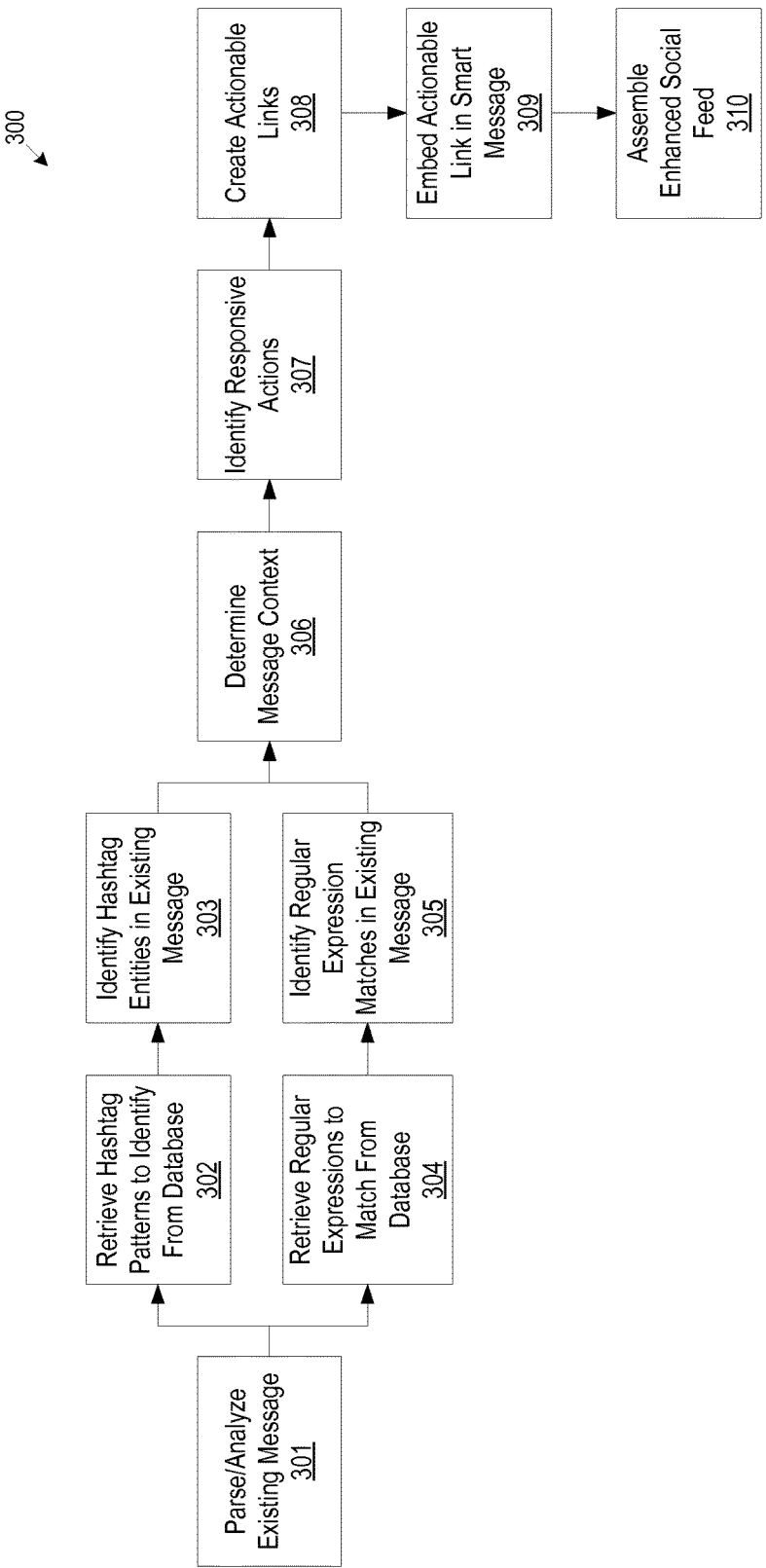
FIG. 3 illustrates some of the logic that the system may employ in generating an enhanced message.

FIG. 3 illustrates, in greater detail, logic 300 that the system 100 may employ in generating an enhanced message 133. As discussed above, the system 100 may parse social messages 123 that have been posted on any social platform 121 and attempt to inferentially determine the context of the message at issue (301). If sufficient contextual information is contained within the existing social message 123, the system 100 may generate an enhanced message 133 that is actionable in some way. The system 100, for example, may determine that a user 110 is attempting to coordinate a meeting, or that the user 110 is requesting or offering assistance on a project. Similarly, the system 100 may manage the distribution of tasks and track their progress. More broadly, the system 100 may analyze the existing social messages 123 to determine if sufficient information is included to make the message actionable. If the system 100 is unable to determine the message context, an enhanced message 133 may not be generated and the existing social message 123 may be included in the enhanced social feed 132 as a regular, non-actionable, message. The system 100 may also assess whether the existing social message 123 provides sufficient information to allow a user 110 to initiate a conversation or dialogue with other system users 110. The system 100, for example, may determine whether the existing social message 123 identifies a user 110 with a corresponding user profile containing the user's contact information.

In analyzing the existing social messages 123, the system 100 may, for instance, analyze the social message 123 content and accompanying information (e.g., message metadata) to determine the substantive context of the social message 123 (i.e., a meeting request, a request for help, or a task assignment). The system 100, for example may determine whether the social message 123 has any identifiable elements, for example, an element that is preceded by a hashtag symbol ("#") or other symbol. In so doing, the system 100 may call upon the database 180 to determine what hashtag symbols to identify (302). The database 180, for example, may direct the system 100 to look for "#meetingrequest" or "#requestforhelp" (303). The system 100 may additionally, or alternatively, evaluate the social message 123 to see if the social message 123 matches a known pattern or sequence of characters (e.g., regular expression matching). The database 180 may provide the regular expressions that the system 100 evaluates or matches against the social message 123 content (304). In the context of scheduling a meeting, for example, the system 100 may search for a proposed meeting date, for example, by matching the pattern "mm/dd/yyyy" and/or "hh:mm" (305). The system 100 may use these identifiable elements to determine the message context (306).

The system 100 may employ additional techniques in determining the message context, including for example natural language processing techniques, which may search and test for different relationships in the social message 123. In so doing, the system 100 may use a domain specific ontology, which may be stored in database 180. In the context of managing tasks, for example, the system 100 may be able to determine when multiple tasks are being discussed and may determine an order in which they should be handled (e.g., by identifying "first" before "then").

The system 100 may also look at other information, for example, the meta-data associated with a social message 123, in determining a social message 123 context. In some cases, the system 100 may look at the user 110 who posted the social message 123 to help determine the social message 123 context. For example, an office manager user 110 may generally be responsible for assigning tasks. The system 100 may also look at temporal relationships between social messages 123, for example, to differentiate between a social message 123 in which a meeting is being requested or a social message 123 in which an alternative meeting time is being proposed.

With the corresponding social message 123 context determined, the system 100 may identify an action that the user 110 may take in response to the social message 123. The identified action may be context dependent (307). In identifying the responsive actions that a user 110 may take, the system 100 may reference database 180 which may help to define the context specific actions. The database 180 may provide domain specific input, for example, defining actions for a financial domain, a medical domain, or an interior design domain. As a general example, a user 110 may typically respond to a meeting request by accepting the request, rejecting the request, or proposing an alternative meeting time. As another example, in the request for help context, a user 110 may respond to such messages by accepting or offering help, or by suggesting other users 110 who may help.

The system 100 may further facilitate the user 110 to take or perform these actions, for example, through its integration with enterprise applications 150 and existing social platforms 121. The system 100, for example, may retrieve or generate actionable links for each of the desired actions, which may be configured to invoke a method or service, provided by the enterprise applications 150 or social platforms 121, to perform the specific action (308).

The system 100, for example, may provide an actionable link that invokes a method or service provided by the Microsoft Exchange™ servers 150, which may add or schedule a meeting on the user's 110 calendar. As another example, the system 100 may invoke a service provided by the Microsoft Project™ server to assign a task to a user 110 or update the status of a task being performed by a user 110.

The parameters that may be provided to the enterprise application 150 or social platform 121 may vary depending on the service that is being invoked. In scheduling a meeting for example, the Microsoft Exchange™ application 150 service may receive parameters like date, time, location and participants. In assigning a task, the Microsoft Project™ service, for example, may receive a task identifier, the name of the user 110 to whom the task is to be assigned and the expected duration of the task. The system 100 may establish the parameters for a service during the system configuration process, or when setting up the application for use, and the parameters may depend on a particular usage context or the enterprise applications 150 through which the enhanced social feed 132 may interact.

As noted above, the system 100 may analyze the existing social messages 123 to determine the information that may be used to make the message actionable. The system 100 may process an existing social message 123 to determine this information, for example, by using the techniques described above (e.g., regular expression matching or natural language processing). The service provided by the enterprise application 150 may also treat certain parameters as optional, for example, the enterprise application 150 may optionally allow for the inclusion of an agenda. While the system 100 may process the social message 123 to determine if an agenda was provided (e.g., by processing the meta-data associated with the social message 123), the failure to identify an agenda may not be fatal to invocation of the action.

The system 100 may generate an enhanced message 133 containing the original message content from the existing social message 123 along with any meta-data, as well as one or more embedded actionable links (309). The enhanced message 133 may also allow the user to take more typical actions, for example, allowing the user to reply to the message, and may assist the user in generating this reply message, which itself may be processed by the system 100 to generate an enhanced reply message 133. The system 100 may store the enhanced message 133 in system memory 177 or any other storage system. The system 100 may also choose to store the existing social message 123 and any associated meta-data in the system memory 177. The existing social messages 123 could optionally be included as regular non-actionable messages in the enhanced social feed 132. For example, the system 100 may include the non-actionable message in the enhanced social feed 132 in instances where the existing social message 123 does not contain sufficient information to generate an enhanced message 133, as it may still be significant for a given usage context.

As described in greater detail below, the system 100 may use the enhanced messages 133 and existing social messages 123 to form or assemble an enhanced social feed 132 (310).

Figure 5:
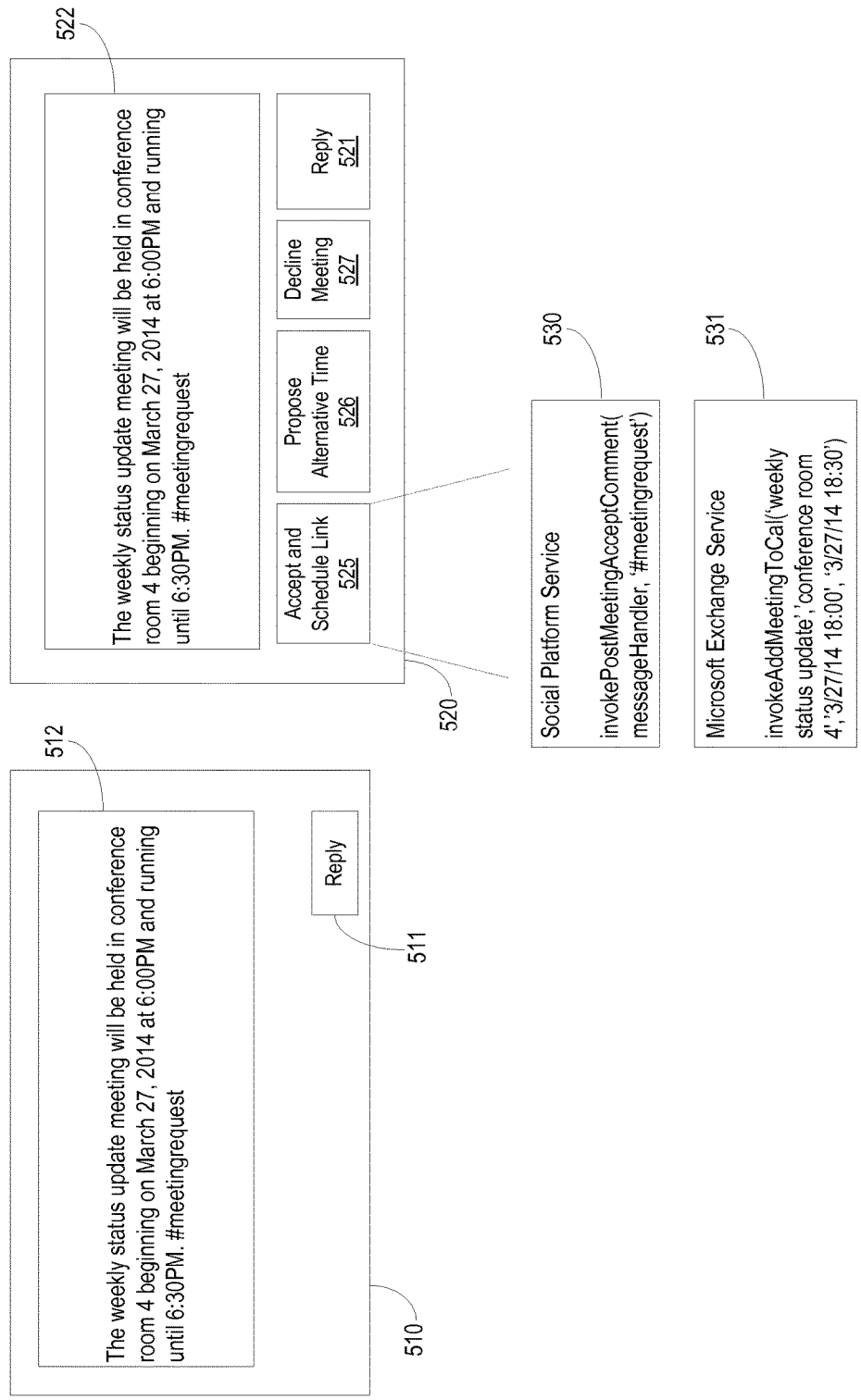
FIG. 5 provides an example of an enhanced message generated by the system, and the existing message from which it was generated.

With reference to FIG. 5, an existing message 510 and an enhanced message 520 are shown. The existing message 510 and enhanced message 520 have the same message content 512,522 along with reply buttons 511,521. But the enhanced message 520 additionally has embedded actionable links, including an accept and schedule link 525, a propose an alternative time link 526, and a decline meeting link 527. The actionable links may invoke certain actions, as illustrated for example, the accept and schedule link 525 may invoke a procedure 530 with the social platform web service to post the accept meeting request message and invoke a procedure 531 with the enterprise application (e.g., Microsoft Exchange™ application) web service to schedule the meeting on the user's 110 calendar.

The enhanced social feed 132 may be seen as an aggregation of enhanced messages 133 and existing non-actionable social messages 123. The aggregation may be selected and assembled based on the context in which the user 110 is consuming the information. For example, the web portal 140 for the enhanced social platform 131 may present the user 110 with an enhanced social feed 132 including all of the social messages 123 or enhanced messages 133 directed to the user 110 (i.e., sent to the user 110 or to a group followed by the user). On the other hand, when working in an enterprise application 150 the user 110 may be presented with an enhanced social feed 132 that includes a sub-set of the social messages 123 or enhanced messages 133 relevant to the document or project that the user 110 is working on. The system 100, for example, may choose to include those social messages 123 or enhanced messages 133 that are related to the document, for example, by matching an identifier (e.g., hashtag) that may be present in the document and social messages 123 or enhanced messages 133.

The user 110 may also affect the manner in which the social messages 123 or enhanced messages 133 are selected for inclusion into an enhanced social feed 132, for example, by adjusting user preferences. In some instances, the user 110 may adjust their preferences so that messages on a particular subject or topic are included in or excluded from the enhanced social feed 132. The user 110 may also actively filter the social messages 123 or enhanced messages 133 in a given enhanced social feed 132 that are displayed or viewed by the user 110. For example, a user 110 may want to focus on certain tasks at different times of the day, for example, choosing to look at project status reports at the beginning of the day. The user 110 may actively filter the enhanced social feed 132 such that only those social messages 123 or enhanced messages 133 in the enhanced social feed 132 relating to status reports are provided within the enhanced social feed 132. The user preferences and filters may be adjusted by the user 110, for example, through one or more interfaces provided by the system plug-in integrated within the enterprise application 150.

Existing social feeds 122 may generally be arranged so that newer social messages 123 are immediately visible (e.g., at the top of the feed), and as new social messages 123 are received they may displace older social messages 123. As noted above, however, many social feeds 122 are passively consumed, and users 110 may inadvertently overlook important social messages 123 if they do not vigilantly monitor a social feed 122 for new social messages 123. The system 100 may better engage the user 110 by ordering the enhanced social feed 132 in a controlled way. The system 100 may be intelligent in this regard in that it may automatically detect those social messages 123 or enhanced messages 133 for specific attention, and promote them to the top of the enhanced social feed 132. For example, the system 100 may identify important social messages 123 or enhanced messages 133 as those that begin with an exclamation mark ("!") or contain some other identifying pattern (e.g., "*URGENT*"). The system 100 may also look at the substantive content of the social message 123 or the enhanced message 133 (e.g., using natural language processing) along with any meta-data. The system 100, for example, may examine the meta-data to determine the team leader or project manager for a given task and may promote messages received from these users 110.

The system 100 may, additionally or alternatively, adjust the appearance of a social message 123 or an enhanced message 133 to reflect the importance of the message 133. For example, those social messages 123 or enhanced messages 133 that are determined to be important may not only be placed atop the enhanced social feed 132 but may also be emphasized with bold lettering, highlighting, or other adjustment to increase noticeability.

As the social messages 123 or enhanced messages 133 that form the enhanced social feeds 132 are stored in system memory 177 or other repository, the system 100 may have enhanced control over the enhanced social feeds 132 and may provide enhanced social feeds 132 that evolve rapidly. The system 100, for example, may remove social messages 123 or enhanced messages 133 when a conversation or discussion has been completed. Once removed, the social messages 123 or enhanced messages 133 may no longer be included in any enhanced social feeds 132 for that user 110, and possibly for any user 110 of the system. The system 100 may remove the social messages 123 or enhanced messages 133 in their entirety (i.e., remove them from system memory 177), or alternatively, flag the social messages 123 or enhanced messages 133 such that the system 100 does not include the flagged social messages 123 or enhanced messages 133 in the enhanced social feeds 132.

By storing the social messages 123 or enhanced messages 133 within the system 100, the system 100 may also be able to capture an entire conversation or discussion, which the system 100 may then integrate into an enterprise knowledge base. By way of example, the system 100 may facilitate a discussion regarding difficulties associated with the development of a new system architecture. The discussion thread may engage the assistance of various experts users 110, who may ultimately resolve the problem. The system 100 may capture this discussion and may integrate it within a knowledge exchange. In doing so, the system 100 may apply certain tags to the captured discussion such that a user 110 searching the knowledge base may return the discussion alongside other pertinent documentation.

The system 100 may further facilitate collaboration by assisting users 110 in generating messages 133 to be delivered to the social platforms 120. By assisting the user in generating a message 133, the system 100 may ensure that sufficient information is provided for the social message 123 to become actionable, and may promote standardization and uniformity in social message 123 content and format. This standardization may promote a more effective enhanced social feed 132, as standardized social messages 123 may be more likely to contain sufficient actionable information and, thus, may be more consistently identified by the system 100. It may also remove functional and psychological barriers that users 110 may face in creating a message. When assisted by the system 100, for example, the user 110 may compose a message in a relatively shorter period of time. Assisted social message 123 generation may also minimize the anxiety that a user 110 may have regarding posting a social message 123 with too much or too little information.

Figure 4:
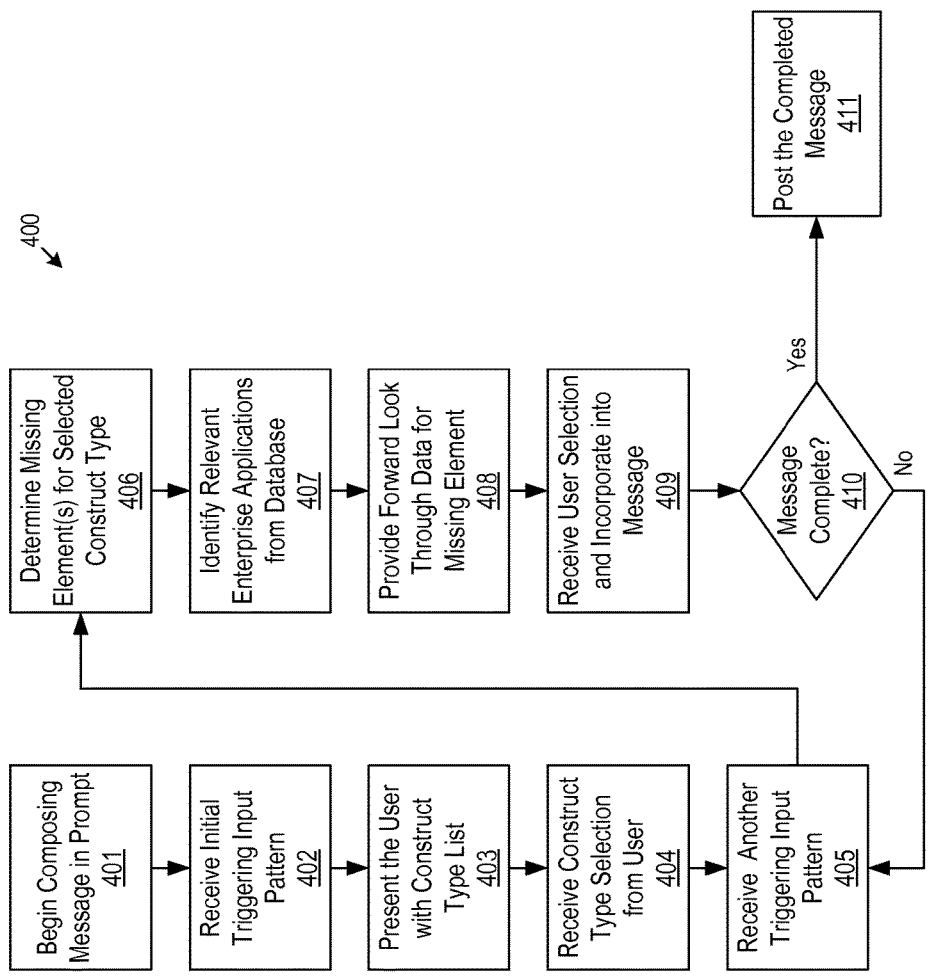
FIG. 4 illustrates an example of the logic that the assisted message generator may employ in helping a user to compose a message.
Figure 6:
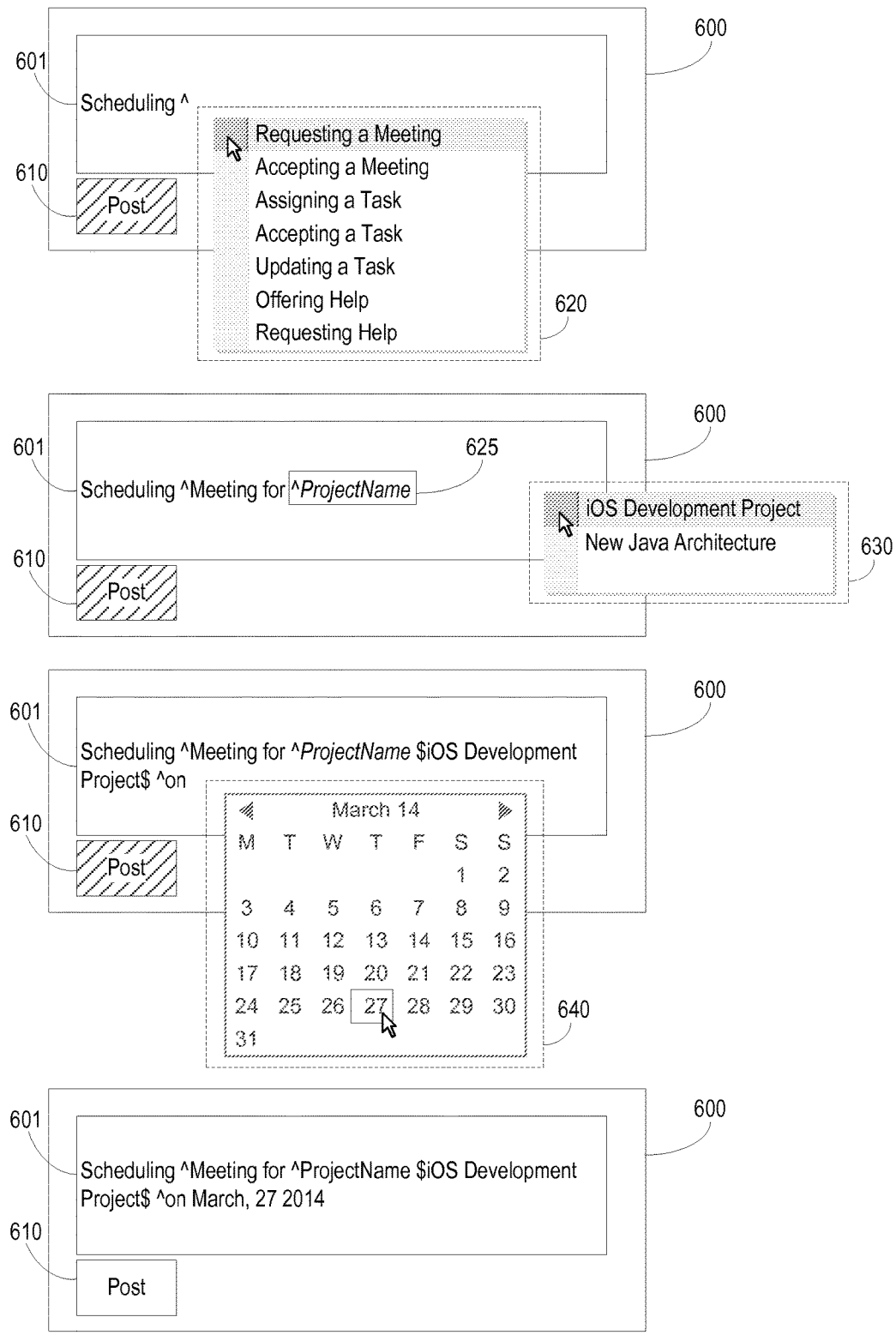
FIG. 6 depicts an assisted message generator at various stages of assisting the user in constructing the message.

FIG. 4 provides an example of the logic 400 that the system 100 may use in assisting the user 110 to generate a message, and FIG. 6 provides an illustration of the process at various stages. The user 110 may compose messages in a variety of different contexts. The user 110, for example, may be provided with assistance when using an enterprise application 150 or when using social platforms 120. The system 100 for example may provide a plug-in to any enterprise application that may allow a user to generate a message directly from the enterprise application 150, so that it may be posted to the various social platforms 120. As illustrated in FIG. 7, for example, an enterprise application 150 may provide an application window 700 having an enhanced social feed region 730 and an assisted message generator region 720 that may enhance the message posting process on existing social platforms 121. The system 100 may provide similar plug-ins to the user 110 that implement the assisted message generator as an enhanced message assistant text box 720. In this way, the user 110 may seamlessly interface with the system 100 over the different communication pathways, for example, through a web-browser or mobile device application provided to the user. Regardless of the communication pathway, as illustrated in FIG. 6, the plug-in may provide or otherwise enable a plug-in region 600 having an enhanced message assistant prompt 601.

The user 110 may begin composing a message, e.g., in a message prompt 601 (401). The system 100 may receive or otherwise monitor this input as the user is typing, for example, through a plug-in, and may actively process the input to determine an initial triggering pattern of symbols (402). The system 100, for example, may process the input and await the use of the caret ("^") operator. Once the initial triggering pattern is received, the system 100 may present the user with a list of message construct types that may represent the different social messages 123 that the system 100 may assist the user in constructing. As illustrated in FIG. 6, for example, the system 100 may present the user 110 with a construct type list 620 as a pop-up menu having different construct type options. Upon entering the caret operator, for example, the user 110 may be presented with a list of messages to create, including for example, meeting requests, accept or decline a meeting, assign a task, accept a task, update a task completion status, and post or accept a request for help (403). The message construct type may be associated with a template message of sorts that the system 100 may use to help guide the user 110 through completion of the message. The template message may identify the elements that the system 100 may need to make the message actionable and may also identify elements that may be optionally included in the completed message. A construct type or template message may be associated with a particular triggering pattern that presents the user 110 with a list of matching construct types. The construct type may similarly identify a triggering pattern which presents the user 110 with a list of other users 110 to whom the message may be sent. The template message may define those parameters to be included in the composed social message 123, where the parameters may ultimately be provided by the system 100. The template message may also define those parameters which the user 110 is expected to enter. For example, the template message may call for the user 110 to fill in the title of the meeting or the topic of discussion.

The user 110 may select a message construct type from the list corresponding to the message that the user is constructing (404), for example, a meeting request construct type. With the construct type selected, the user 110 may continue to compose the social message 123. The system 100, likewise, may continue to process the received input, and may determine if another triggering pattern is received (405). The second triggering pattern may be the same as the initial triggering pattern (e.g., a caret operator) or something different (e.g., "( . . . )").

In response to receiving the second triggering pattern, the system 100 may determine what elements are missing from the then constructed social message 123 and prompt the user 110 to enter this information (406). With respect to the meeting request construct type, for example, the system 100 may prompt the user to enter the topic of discussion, the date and time of the proposed meeting or the participants who are requested to be in attendance. As illustrated in FIG. 6, for example, the user 110, upon entering a caret operator for the second time, may prompt 625 the user 110 for a project name. As another example, with regards to the assign task construct type, the user 110 may be prompted to identify the task name and target completion date.

The system 100 may further assist the user 110 by intelligently providing the user 110 with values to enter in place of the message elements. The system 100, for example, may interface with enterprise applications 150 to perform forward look through operations and provide actual data values to incorporate into the message that the user 110 is constructing (408). The system 100 may communicate with the database 180 to identify the different enterprise applications 150 that the system 100 may communicate with to provide values for a given message element in the selected construct type (407). For instance, when the user 110 is prompted to enter the date and time of the meeting, the system 100 may interface with the Microsoft Exchange™ servers 150 to retrieve and present the user 110 with live calendar data showing the user's 110 availability. With reference to FIG. 6, the system 100 may interface with Microsoft Project™ servers to provide the user 110 with a list 630 of the projects to which they are currently assigned to suggest a topic or subject ("ProjectName") of the meeting. As another example, with regards to the assign task construct type, the system 100 may interface with the Microsoft Project™ servers 150 to identify a list of tasks associated with the user 110 that have yet to be assigned.

The user 110 may select the desired value for the message element from the list of values provided, and the message element may be incorporated into the social message 123 that the user 110 is composing in the social message 123 prompt (409). As illustrated, for example, the user 110 selects the "iOS Development Project" which is inserted into the message prompt 601. The system 100 may assess if the message is complete, and if not the user 110 may continue to compose the message and the system 100 may continue to process the input received to determine when another triggering data pattern is received (410). When the triggering data pattern is received, the system 100 may assess if any message elements are still missing. If the message construct type is not yet complete, the system 100 may prompt the user 110 to enter a value for an additional message element, and may perform a forward look through operation to suggest actual data values to incorporate into the social message 123 that the user 110 is constructing. As illustrated in FIG. 6, for example, the user 110 may be prompted to enter the date of the meeting after the third caret operator is received, and the system 100 may provide a calendar 640 populated with live data from the Microsoft Exchange™ servers. The system 100 may continue this process until each message element of the chosen message construct type has been entered by the user 110, at which point the user 110 may post the message (411). With reference to FIG. 6, the system 100 may only allow the user 110 to post a message once sufficient information has been entered, and may disable the post message 610 until such information is received. The system 100 may also convert the posted social message 123 into an enhanced message 133 for incorporation into enhanced social feeds 132. The system may employ logic similar to that illustrated in FIG. 3 and described above.

The system 100 may also be able to assist the user 110 in posting the social message 123 such that the social message 123 may reach the target user 110 audience. By way of example, a user 110 may need assistance with a particular problem they are facing (e.g., problems with the new Java architecture), and may wish to post a request for help. The system 100 may help the user 110 identify the different groups to which the post should be sent, where the different groups may exist on several different social platforms 120. For example, there may be several groups, across different social platforms 120 that are discussing the problem or have users 110 with the skill necessary to assist with the problem. The user 110 may not be subscribed to or familiar with all of the available groups, and may post the request for help on a group familiar to the user 110. This group, however, may be focused on a different topic (e.g., discussing an older Java architecture). The system 100 may recognize that the users 110 request is misdirected, for example, by comparing an identifier (e.g., a hashtag) in the social message 123 with an identifier of the group. The system 100 may identify other groups that are more appropriate for the request, for example, based on the group identifier (e.g., a hashtag), and the system 100 may suggest these additional groups to the user 110.

The system 100 may also present the user 110 with the ability to automatically replicate the social message 123 post on one or more of the suggested groups. If the user 110 chooses to replicate the message, the system 100 may connect to the social platforms 120 associated with the selected groups (i.e., through a web service) and may post the social message 123 for the user 110.

The system 100 may also help the user 110 to track the responses received for each post across the various social feeds 122 and platforms 120. The system 100 may consolidate the different threads into a consolidated enhanced social feed 132 on the enhanced social platform 131. As noted earlier, the system 100, for example, may receive a handle or identifier from the social platform 120 related to a social message 123, for example when the social message 123 is first posted. The system 100 may identify subsequent social messages 123 in the thread based on the social message 123 handle. The system 100 may also perform various logical operations in preparing the consolidated enhanced social feed 132, for example, limiting the messages to those received within a certain temporal window. The system 100 additionally, or alternatively, may consolidate the different messages based on a message identifier (e.g., hashtag).

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A method for generating an enhanced social feed in an enhanced social platform, the method comprising:
retrieving an existing social feed from an existing social platform;
parsing the existing social feed to extract an original social message;
analyzing the original social message to determine a corresponding message context by searching for identifiable elements predefined and stored in a database;
identifying a specific action to be taken in response to the original social message based on the corresponding message context by referencing the database, wherein various specific actions corresponding to various message contexts are predefined and stored in the database;
generating an intelligent button for the specific action by integrating an application with the existing social platform, the intelligent button comprising a responsive message corresponding to the specific action, and the intelligent button configured to invoke a service provided by the application to perform the specific action;
generating a new message comprising content of the original social message and the intelligent button;
storing the new message in a storage medium;
generating the enhanced social feed by placing the new message in the enhanced social feed; and
displaying the enhanced social feed in the enhanced social platform.

2. The method of claim 1, further comprising:
receiving an enhanced social feed request, the enhanced social feed request including parameters describing a feed context;
generating the enhanced social feed comprising:
selecting the new message for inclusion in the enhanced social feed when the corresponding message context matches the feed context; and
placing the new message in the enhanced social feed.

3. The method of claim 2, further comprising:
determining an importance of the new message;
adjusting a position of the new message in the enhanced social feed based on the importance of the new message; and
adjusting an appearance of the new message in the enhanced social feed based on the importance of the new message.

4. The method of claim 3, wherein the importance of the new message is determined from content of the new message.

5. The method of claim 4, wherein the importance of the new message is determined based on an identifying pattern in the content of the new message.

6. The method of claim 2, wherein selecting the new message for inclusion in the enhanced social feed is based on user preferences.

7. The method of claim 2, wherein selecting the new message for inclusion in the enhanced social feed further comprises determining if the new message has been flagged for exclusion from enhanced social feeds.

8. The method of claim 1, wherein, upon receipt of an input on the intelligent button, the intelligent button invokes a procedure having specific action parameters, parameter values being determined by analyzing the content of the original social message.

9. The method of claim 1, wherein analyzing the original social message comprises:
performing a keyword search.

10. The method of claim 1, wherein analyzing the original social message comprises:
performing a regular expression search.

11. A system for generating an enhanced social feed in an enhanced social platform, the system comprising:
a network interface adapted to retrieving an existing social feed from an existing social platform;
processing circuitry in communication with the network interface and a memory;
the memory adapted to store the existing social feed and instructions for execution by the processing circuitry that cause the system to:
parse the existing social feed to extract an original social message;
analyze the original social message to determine a corresponding message context by searching for identifiable elements predefined and stored in a database;
identify a specific action to be taken in response to the original social message based on the corresponding message context by referencing the database, wherein various specific actions corresponding to various message contexts are predefined and stored in the database;
generate an intelligent button for the specific action by integrating an application with the existing social platform, the intelligent button comprising a responsive message corresponding to the specific action, and the intelligent button configured to invoke a service provided by the application to perform the specific action;
generate a new message comprising content of the original social message and the intelligent button;
store the new message in the memory;
generate the enhanced social feed by placing the new message in the enhanced social feed; and
display the enhanced social feed in the enhanced social platform.

12. The system of claim 11, wherein the instructions for execution by the processing circuitry cause the system to:
receive an enhanced social feed request, the enhanced social feed request including parameters describing a feed context;
generate the enhanced social feed comprising:
select the new message for inclusion in the enhanced social feed when the corresponding message context matches the feed context; and
place the new message in the enhanced social feed.

13. The system of claim 12, wherein the system further:
determines an importance of the new message;
adjusts a position of the new message in the enhanced social feed based on the importance of the new message; and
adjusts an appearance of the new message in the enhanced social feed based on the importance of the new message.

14. The system of claim 13, wherein the importance of the new message is determined through analysis of content of the new message.

15. The system of claim 12, wherein the system also selects the new message for inclusion in the enhanced social feed when user preferences or filters are met.

16. The system of claim 12, wherein the system further determines if the new message has been flagged for exclusion from enhanced social feeds when the system selects the new message for inclusion in the enhanced social feed.

17. The system of claim 11, wherein, upon receipt of an input on the intelligent button, the intelligent button invokes a procedure having specific action parameters, parameter values being determined by analyzing the content of the original social message.

* * * * *